United States Patent
Roy Thill et al.

(10) Patent No.: US 10,145,308 B2
(45) Date of Patent: Dec. 4, 2018

(54) GAS TURBINE ENGINE RING SEAL

(71) Applicant: United Technologies Corporation, Hartford, CT (US)

(72) Inventors: Carson A. Roy Thill, South Berwick, ME (US); Mark Broomer, Boston, MA (US); Timothy M. Davis, Kennebunk, ME (US); Craig R. McGarrah, Southington, CT (US); Mark J. Rogers, Kennebunk, ME (US); Russell E. Keene, Arundel, ME (US); Anthony B. Swift, Waterboro, ME (US)

(73) Assignee: United Technologies Corporation, Farmington, CT (US)

( * ) Notice: Subject to any disclaimer, the term of this patent is extended or adjusted under 35 U.S.C. 154(b) by 447 days.

(21) Appl. No.: 14/611,920

(22) Filed: Feb. 2, 2015

(65) Prior Publication Data

US 2015/0226132 A1     Aug. 13, 2015

Related U.S. Application Data

(60) Provisional application No. 61/937,674, filed on Feb. 10, 2014.

(51) Int. Cl.
| | |
|---|---|
| *F02C 7/28* | (2006.01) |
| *F01D 11/00* | (2006.01) |
| *F01D 25/24* | (2006.01) |
| *F02C 3/04* | (2006.01) |
| *F16J 15/08* | (2006.01) |

(52) U.S. Cl.
CPC .............. *F02C 7/28* (2013.01); *F01D 11/005* (2013.01); *F01D 25/24* (2013.01); *F01D 25/246* (2013.01); *F02C 3/04* (2013.01); *F16J 15/0887* (2013.01); *F05D 2240/56* (2013.01); *F05D 2240/58* (2013.01); *F05D 2260/30* (2013.01)

(58) Field of Classification Search
CPC .... F02C 7/28; F02C 3/04; F01D 25/24; F01D 25/246; F01D 11/005; F05D 2240/58; F05D 2260/30; F05D 2250/75
USPC ................... 415/173.1, 173.3, 173.5, 174.2
See application file for complete search history.

(56) References Cited

U.S. PATENT DOCUMENTS

| | | | |
|---|---|---|---|
| 4,314,793 A | | 2/1982 | Detolla et al. |
| 4,642,024 A | * | 2/1987 | Weidner .................. F01D 11/08 415/116 |

(Continued)

FOREIGN PATENT DOCUMENTS

| | | |
|---|---|---|
| DE | 102010032846 | 2/2012 |
| EP | 2589757 | 5/2013 |
| WO | 2011153393 | 12/2011 |

OTHER PUBLICATIONS

Extended EP Search Report for EP Application No. 15154384.0 dated Aug. 3, 2015.

(Continued)

*Primary Examiner* — Michael R Reid
(74) *Attorney, Agent, or Firm* — Carlson, Gaskey & Olds, P.C.

(57) ABSTRACT

A seal assembly for a gas turbine engine includes an engine static structure. First and second members fluidly separate cavities from one another. A seal assembly is captured by the engine structure. The seal assembly includes a carrier and a seal that engages the first member. The second member is captured by the carrier.

16 Claims, 2 Drawing Sheets

(56) References Cited

U.S. PATENT DOCUMENTS

| | | | |
|---|---|---|---|
| 4,643,638 A | | 2/1987 | Laurello |
| 4,648,792 A | | 3/1987 | Baran |
| 4,925,365 A | | 5/1990 | Crozet |
| 5,044,881 A | * | 9/1991 | Dodd ................. F01D 11/24 415/173.3 |
| 5,476,198 A | | 12/1995 | Jouillat et al. |
| 6,357,752 B1 | * | 3/2002 | Lampes ................. F01D 9/023 277/355 |
| 7,296,967 B2 | | 11/2007 | Shapiro |
| 7,360,988 B2 | | 4/2008 | Lee et al. |
| 9,879,556 B2 | * | 1/2018 | Chuong ................. F01D 25/30 |
| 2005/0163608 A1 | * | 7/2005 | Okita ................. F01D 5/082 415/115 |
| 2008/0056890 A1 | * | 3/2008 | Ivakitch ............... F01D 11/003 415/174.4 |
| 2011/0081237 A1 | | 4/2011 | Durocher et al. |
| 2012/0292862 A1 | | 11/2012 | Moehrle et al. |

OTHER PUBLICATIONS

Partial EP Search Report for EP Application No. 15154384.0 completed Apr. 10, 2015.

U.S. Appl. No. 14/296,657, filed Jun. 5, 2014 titled Gas Turbine Engine Vane-to-Transition Duct Seal.

* cited by examiner

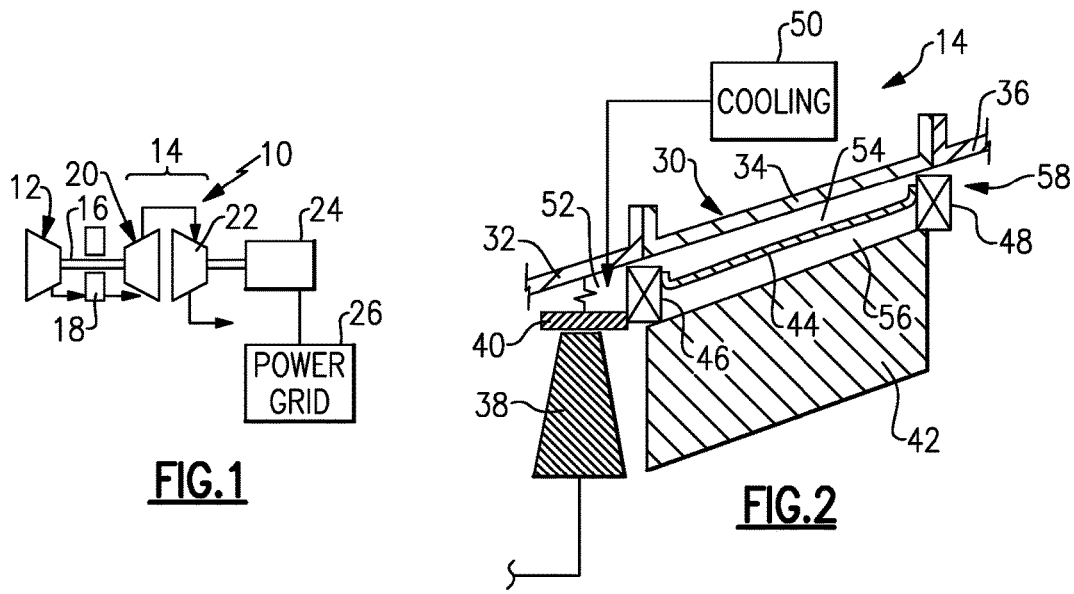
FIG.1
FIG.2
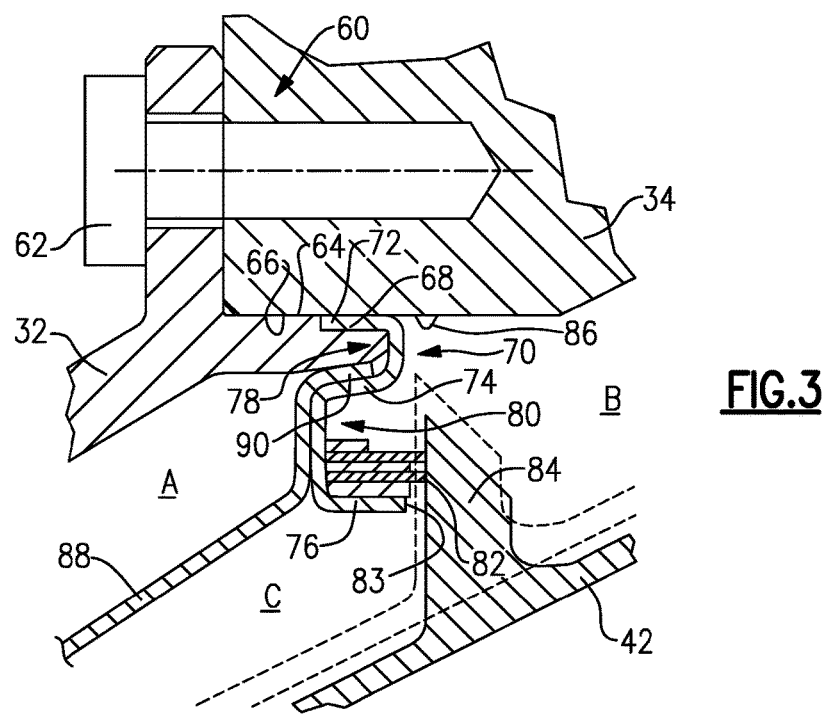
FIG.3

GAS TURBINE ENGINE RING SEAL

CROSS-REFERENCE TO RELATED APPLICATIONS

This application claims priority to U.S. Provisional Application No. 61/937,674, which was filed on Feb. 10, 2014 and is incorporated herein by reference.

BACKGROUND

This disclosure relates to a seal for a gas turbine engine. More particularly, the disclosure relates to a ring seal that, in one example application, is used to separate three plenums.

A gas turbine engine typically includes a compressor section, a combustor section and a turbine section. Air entering the compressor section is compressed and delivered into the combustion section where it is mixed with fuel and ignited to generate a high-speed exhaust gas flow. In one example, the high-speed exhaust gas flow expands through the turbine section to drive the compressor and a ground-based generator for industrial gas turbine engine applications.

One example turbine section includes high and low pressure turbine sections. A duct is arranged between the high and low pressure turbine sections to communicated core flow gases. A rather complex arrangement of fluid cavities may be provided radially inward of an outer case of the engine's static structure. It is desirable to prevent leaks between the cavities to enable efficient use of engine's fluids, such as compressor bleed air. Typically multiple components are secured to one another in the area of these cavities, which makes efficiently sealing the cavities difficult.

SUMMARY

In one exemplary embodiment, a seal assembly for a gas turbine engine includes an engine static structure. First and second members fluidly separate cavities from one another. A seal assembly is captured by the engine structure. The seal assembly includes a carrier and a seal that engages the first member. The second member is captured by the carrier.

In a further embodiment of the above, the carrier has first and second legs. The first leg is captured by an attachment feature on the engine static structure and the second leg supports the seal.

In a further embodiment of the above, the engine static structure includes first and second case portions that are secured to one another at a joint. The carrier is arranged at the joint.

In a further embodiment of any of the above, the joint includes a groove that provides the attachment feature.

In a further embodiment of any of the above, the first and second case portions are first and second outer case structures secured to one another at a flanged joint. The groove extends in an axial direction.

In a further embodiment of any of the above, the first outer case structure provides an outer diameter. The second outer case structure includes an inner diameter that radially locates relative to the outer diameter. The groove is provided at the inner and outer diameters.

In a further embodiment of any of the above, the second outer case structure includes a protrusion arranged adjacent to the first leg to axially retain the carrier within the groove.

In a further embodiment of any of the above, the member is a duct providing a turbine exhaust flow path.

In a further embodiment of any of the above, the duct includes a radially extending flange against which the seal engages.

In a further embodiment of any of the above, the carrier is generally S-shaped and provides first and second annular recesses respectively arranged between the first leg and an intermediate leg and the intermediate leg and the second leg.

In a further embodiment of any of the above, a second member has an end captured between the intermediate leg and the engine static structure.

In a further embodiment of any of the above, the second member separates first and third cavities. The seal separates a second and the third cavities.

In a further embodiment of any of the above, the first cavity is configured to be at a greater pressure than the second cavity. The second cavity is configured to be at a greater pressure than the third cavity.

In a further embodiment of any of the above, the seal is one of a brush seal, W seal or piston seal.

In a further embodiment of any of the above, the seal is secured to the carrier to provide an integrated line replaceable unit.

In another exemplary embodiment, a seal assembly for a gas turbine engine includes an annular seal assembly that includes a carrier and a seal. The carrier is generally S-shaped and has first, intermediate and second legs. The second leg supports the seal. The carrier provides first and second annular recesses respectively arranged between the first leg and an intermediate leg and the intermediate leg and the second leg. The seal is arranged in the second annular recess. The first annular recess is configured to receive a portion of an engine static structure.

In a further embodiment of any of the above, the seal is one of a brush seal, W seal or piston seal. The seal extends axially beyond a terminal end of the second leg.

In a further embodiment of any of the above, the seal is secured to the carrier to provide an integrated line replaceable unit.

In another exemplary embodiment, a seal assembly for a gas turbine engine includes an engine static structure that includes first and second case portions secured to one another at a joint. A member separates the cavities. A seal assembly is arranged beneath the joint and includes a carrier and a seal. The carrier has first and second legs with the first leg secured to the first case portion. The second leg supports the seal with the seal engaging the member.

In a further embodiment of the above, there is a second member that separates first and third cavities. The seal separates a second and the third cavities.

In a further embodiment of any of the above, the first leg and the second member are fastened to the first portion to separate first and third cavities.

In a further embodiment of any of the above, the carrier is generally S-shaped and provides first and second annular recesses respectively arranged between the first leg and an intermediate leg and the intermediate leg and the second leg.

In a further embodiment of any of the above, the second member has an end captured between the intermediate leg and the engine static structure.

BRIEF DESCRIPTION OF THE DRAWINGS

The disclosure can be further understood by reference to the following detailed description when considered in connection with the accompanying drawings wherein:

FIG. 1 is a schematic view of an example industrial gas turbine engine.

FIG. 2 is a schematic view of a portion of a turbine section including a duct.

FIG. 3 is an example enlarged cross-sectional view of one example component and seal support assembly.

Figure 4:
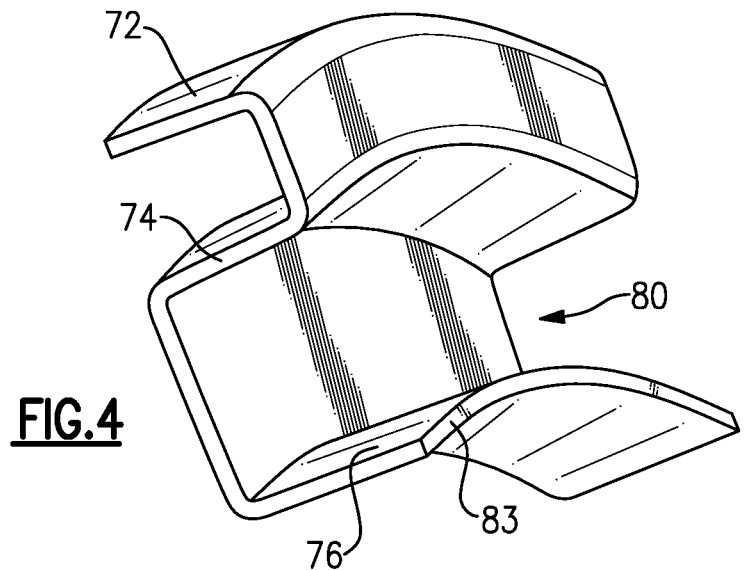
FIG. 4 is a broken view of a portion of the annular component and seal support assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

A schematic view of an industrial gas turbine engine 10 is illustrated in FIG. 1. The engine 10 includes a compressor section 12 and a turbine section 14 interconnected to one another by a shaft 16. A combustor 18 is arranged between the compressor and turbine sections 12, 14. The turbine section 14 includes first and second turbines that correspond to high and low pressure turbines 20, 22.

A generator 24 is rotationally driven by a shaft coupled to the low pressure turbine 22, or power turbine. The generator 24 provides electricity to a power grid 26. It should be understood that the illustrated engine 10 is highly schematic, and may vary from the configuration illustrated. Moreover, the disclosed seal assembly may be used in commercial and military aircraft engines as well as industrial gas turbine engines. Accordingly, the engine may be configured in a manner that is different than illustrated in the Figures.

The gas turbine engine 10 is shown in more detail in the area of the turbine section in FIG. 2, however, it should be understood that the seal assembly may be used in other locations within the engine. An engine static structure 30 and includes first, second and third case portions 32, 34, 36 which may correspond to a turbine exhaust case. The case portions are secured to one another at a flanged joint, for example. In one example, the first case portion 32 supports a blade outer air seal 40, which provides a seal relative to blades 38.

A duct 42 and member 44 are supported relative to the engine static structure 30 and are illustrated in a highly schematic manner. Seal assemblies 46, 48 are used to provides seals between various components, such as the engine static structure 30, duct 42 and member 44, to separate cavities 52, 54, 56, 58 from one another. The disclosed seal assembly can be used for transition ducts, turbine exhaust cases or in the compressor section, for example.

A cooling source 50, such as bleed air from the compressor section 12 (FIG. 1), provides the cooling fluid to the cavity 52, which supplies cooling fluid to the blade outer air seal 40, for example. Fluid may be provided to the engine static structure 30 in a manner other than disclosed, if desired.

Referring to FIG. 3, the first and second portions 32, 34, for example, are secured to one another at a joint 60 by a fastener 62. The first case portion 32 provides an outer diameter 64, and the second case portion 34 includes an inner diameter 66 that radially locates the first case portion 32 relative to the outer diameter 64. A groove 68, which extends in an axial direction of the engine, is provided at the inner and outer diameters 66, 64 between the first and second case portions 32, 34.

A member, which may provide the duct 42, separates second and third cavities B, C in cooperation with the seal assembly. A second member 88 separates first and third cavities A, C. In the example, the first cavity A is configured to be at a greater pressure than the second cavity B, and the second cavity B is configured to be at a greater pressure than the third cavity C.

In the examples, the seal assembly is arranged beneath the joint 60 and separates cavities A and B. The seal assembly includes a carrier 70 and a seal 82. The member 42 includes a radially extending flange 84 against which the seal 82 engages. The carrier 70 and/or the seal 82 may be a continuous, unbroken ring and/or arcuate segments.

The carrier 70 has first, intermediate and second legs 72, 74, 76 arranged in an S-shape, for example, to provide first and second annular recesses 78, 80 (also shown in FIG. 4). The first leg 72 is captured in the groove 68 such that the carrier 70 is constrained by the first and second case portions 32, 34 without the need for additional, separate retention elements. The carrier 70 also acts as a heat shield for the flanged joint 60. In the example shown in FIG. 3, the second case portion 34 includes a protrusion 86 arranged adjacent to the first leg 72 to axially retain the carrier 70 within the groove 68, however, the protrusion 86 may be integral with the second case portion 34, so no additional component are required.

The second member 88 has an end 90 captured in the first annular recess 78 between the intermediate leg 74 and the first case portion 32 of the engine static structure 30. In one example, the second member 88 supports a blade outer air seal.

The second annular recess 80 receives the seal 82, which extends beyond a terminal end 83 of the second leg 76 to engage the flange 84 of the member 42. The seal 82 can move axially and the components thermally expand and contract relative to one another to maintain a seal. The seal 82 also is permitted to move somewhat radially, which also minimizes leakage between the various cavities. The seal 82 may be secured to the second leg 76 or other portion of the carrier 70 to provide an integrated line replaceable unit for ease of service.

Figure 5:
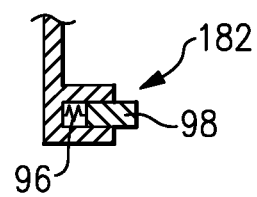
FIG. 5 illustrates a portion of the carrier with a piston ring seal arrangement.
Figure 6:
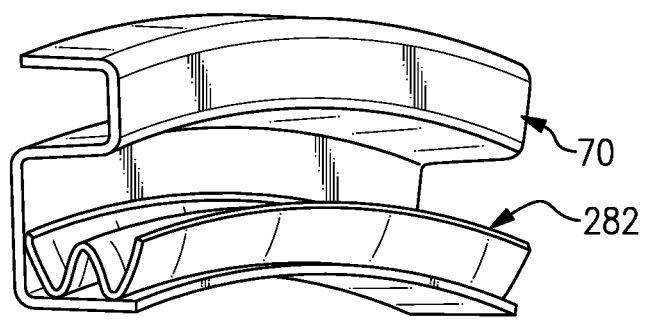
FIG. 6 depicts a cross-section of the carrier with an example W seal.

In the example shown in FIG. 3, the seal 82 is a brush seal. The seal 182 may also be provided by a piston seal arrangement as shown in FIG. 5, which includes a piston 98 biased axially outward by a spring element, such as a wave washer 96. A W seal 282 may also be used, as illustrated in FIG. 6.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
engine static structure that includes first and second case portions secured to one another at a joint that provides a groove extending in an axial direction;
first and second members fluidly separating cavities from one another; and
a seal assembly constrained by the engine structure, the seal assembly includes a carrier and a seal that engages the first member, wherein the first member is a duct providing a turbine exhaust flow path, and the second member constrained by the carrier, and the carrier has an end in the groove, the end is removably captured between the first and second case portions.

2. The gas turbine engine according to claim 1, wherein the carrier has first and second legs, and the second leg supporting the seal.

3. The gas turbine engine according to claim 2, wherein the groove provides an attachment feature that receives the first leg which provides the end.

4. The gas turbine engine according to claim 3, wherein the first and second case portions are first and second outer case structures secured to one another at the joint which includes a flange.

5. The gas turbine engine according to claim 4, wherein the first outer case structure provides an outer diameter, and the second outer case structure includes an inner diameter that radially locates relative to and is nested with respect to the outer diameter, the groove provided at the inner and outer diameters.

6. The gas turbine engine according to claim 1, wherein the duct includes a radially extending flange against which the seal engages.

7. The gas turbine engine according to claim 2, wherein the carrier is generally S-shaped and provides first and second annular recesses respectively arranged between the first leg and an intermediate leg and the intermediate leg and the second leg.

8. The gas turbine engine according to claim 7, wherein the second member has an end constrained between the intermediate leg and the engine static structure.

9. The gas turbine engine according to claim 8, wherein the cavities includes first, second and third cavities, the second member separates the first and third cavities, and the seal separates the second and third cavities.

10. The gas turbine engine according to claim 9, wherein the first cavity is configured to be at a greater pressure than the second cavity, and the second cavity is configured to be at a greater pressure than the third cavity.

11. The gas turbine engine according to claim 1, wherein the seal is one of a brush seal, W seal or piston seal.

12. The gas turbine engine according to claim 11, wherein the seal is secured to the carrier to provide an integrated line replaceable unit.

13. The gas turbine engine according to claim 1, wherein the seal assembly is annular, the carrier is generally S-shaped and has first, intermediate and second legs, the second leg supports the seal, the carrier provides first and second annular recesses respectively arranged between the first leg and an intermediate leg and the intermediate leg and the second leg, the seal arranged in the second annular recess, and the first annular recess configured to receive a portion of the engine static structure.

14. The gas turbine engine according to claim 13, wherein the seal is one of a brush seal, W seal or piston seal, the seal extending axially beyond a terminal end of the second leg.

15. The gas turbine engine according to claim 13, wherein the seal is secured to the carrier to provide an integrated line replaceable unit.

16. A gas turbine engine comprising:
engine static structure;
first and second members fluidly separating cavities from one another;
a seal assembly constrained by the engine structure, the seal assembly includes a carrier and a seal that engages the first member, wherein the first member is a duct providing a turbine exhaust flow path, and the second member constrained by the carrier; and
wherein the carrier has first and second legs with the first leg constrained by an attachment feature on the engine static structure, and the second leg supporting the seal, wherein the engine static structure includes first and second case portions secured to one another at a joint, the carrier arranged at the joint, wherein the joint includes a groove that provides the attachment feature, wherein the first and second case portions are first and second outer case structures secured to one another at a flanged joint, the groove extending in an axial direction, wherein the first outer case structure provides an outer diameter, and the second outer case structure includes an inner diameter that radially locates relative to the outer diameter, the groove provided at the inner and outer diameters, wherein the second outer case structure includes a protrusion arranged adjacent to the first leg to axially retain the carrier within the groove.

* * * * *